United States Patent [19]
Sawyer

[11] Patent Number: 6,084,628
[45] Date of Patent: Jul. 4, 2000

[54] SYSTEM AND METHOD OF PROVIDING TARGETED ADVERTISING DURING VIDEO TELEPHONE CALLS

[75] Inventor: Francois Sawyer, St-Hubert, Canada

[73] Assignee: Telefonaktiebolaget LM Ericsson (publ), Stockholm, Sweden

[21] Appl. No.: 09/216,646

[22] Filed: Dec. 18, 1998

[51] Int. Cl.[7] ...................................................... H04N 7/14
[52] U.S. Cl. ...................... 348/14; 379/93.17; 379/93.12
[58] Field of Search .............. 379/93.12, 93.17, 379/93.25, 93.22; 348/14, 15, 16; 705/27

[56] References Cited

U.S. PATENT DOCUMENTS

| 5,913,040 | 6/1999 | Rakavy et al. | 395/200.62 |
| 5,918,014 | 6/1999 | Robinson | 395/200.49 |

FOREIGN PATENT DOCUMENTS

| 97247276 | 9/1997 | Japan . |
| WO 96/41473 | 12/1996 | WIPO . |

OTHER PUBLICATIONS

WO 96/30864, Schena et al., Interactive asvertisement system and device, Oct. 3, 1996.

*Primary Examiner*—Curtis A. Kuntz
*Assistant Examiner*—Melur Ramakrishnaiah
*Attorney, Agent, or Firm*—Smith & Danamraj, PC

[57] ABSTRACT

A system in a telecommunications network for providing targeted advertising to subscribers utilizing display screens to conduct a video telephone call. The system comprises a centralized database of subscriber advertising preferences, an information source, a calling subscriber's switch connected to the database and the information source, and a called subscriber's switch connected to the calling subscriber's switch. The database of subscriber advertising preferences stores advertising preferences for subscribers in the network, and is updated whenever a subscriber selects a displayed advertisement for more information. The information source stores a plurality of advertisements, and includes an advertisement selector which selects advertisements based on the advertising preferences for an identified subscriber such as the calling subscriber. The calling subscriber's switch retrieves the advertising preferences for the calling subscriber from the database and sends the preferences to the information source. The switch then retrieves the selected advertisements from the information source and generates a window on the calling subscriber's display screen which displays the retrieved advertisements. The retrieved advertisements are also sent to the called subscriber's switch for simultaneous display to the called subscriber.

28 Claims, 4 Drawing Sheets

SYSTEM AND METHOD OF PROVIDING TARGETED ADVERTISING DURING VIDEO TELEPHONE CALLS

BACKGROUND OF THE INVENTION

1. Technical Field of the Invention

This invention relates to telecommunication networks, and in particular, to a system for providing targeted advertisements to subscribers during video telephone calls.

2. Description of Related Art

Video teleconferencing has existed for a number of years, but due to its high-cost, it has not gained widespread acceptance. As technology advances, methods are being developed to provide more bandwidth over telephone lines, making the possibility of widespread video telephony more realistic. However, the cost is still too high for widespread applications in the commercial and private sectors.

Concurrently, advertisers continue to look for new ways to advertise their products, and to advertise more effectively. Methods of targeting advertising have become increasingly sophisticated. For example, many grocery stores now print coupons for customers at the checkout counter which provide discounts for items similar to those that the customer just purchased. Meanwhile, commercial use of the Internet also continues to grow. Revenues from advertisements are increasingly used to make Internet services viable. Search engines on the Internet and push technology provide constantly updated advertisements to consumers.

It would be a distinct advantage to have a system that provides targeted advertising to telephone subscribers who are involved in a video telephone call. Fees from such advertising could be utilized to subsidize the high cost of video telephony, thus enabling widespread use of this technology. Such a system would also provide advertisers with a new medium for selling their goods and services. The present invention provides such a system.

SUMMARY OF THE INVENTION

In one aspect, the present invention is a system in a telecommunications network for providing targeted advertising to subscribers utilizing display screens to conduct a video telephone call. The system comprises a centralized database of subscriber advertising preferences, an information source, a calling subscriber's switch connected to the database and the information source, and a called subscriber's switch connected to the calling subscriber's switch. The database of subscriber advertising preferences stores advertising preferences for subscribers in the network, including the calling subscriber. The information source includes a plurality of advertisements, and means for selecting advertisements from the plurality of advertisements based on the advertising preferences for an identified subscriber such as the calling subscriber. The calling subscriber's switch includes means for retrieving the advertising preferences for the calling subscriber from the database and sending the preferences to the information source. The switch also includes means for retrieving the selected advertisements from the information source, and means for generating a window on the calling subscriber's display screen which displays the retrieved advertisements. The retrieved advertisements are also sent to the called subscriber's switch for simultaneous display to the called subscriber.

The database may also store advertising preferences for the called subscriber, and the information source may also select advertisements based on the advertising preferences for the called subscriber. These advertisements may be retrieved and sent to the called subscriber's switch for display to the called subscriber during the call.

The displays are interactive displays, and the subscribers may select particular advertisements for which they desire more information. When an advertisement is selected, both subscribers view the additional information. If the two subscribers are viewing different advertisements based on their differing preferences when an advertisement is selected by one of the subscribers, the selected advertisement takes precedence, and is shown to both subscribers.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
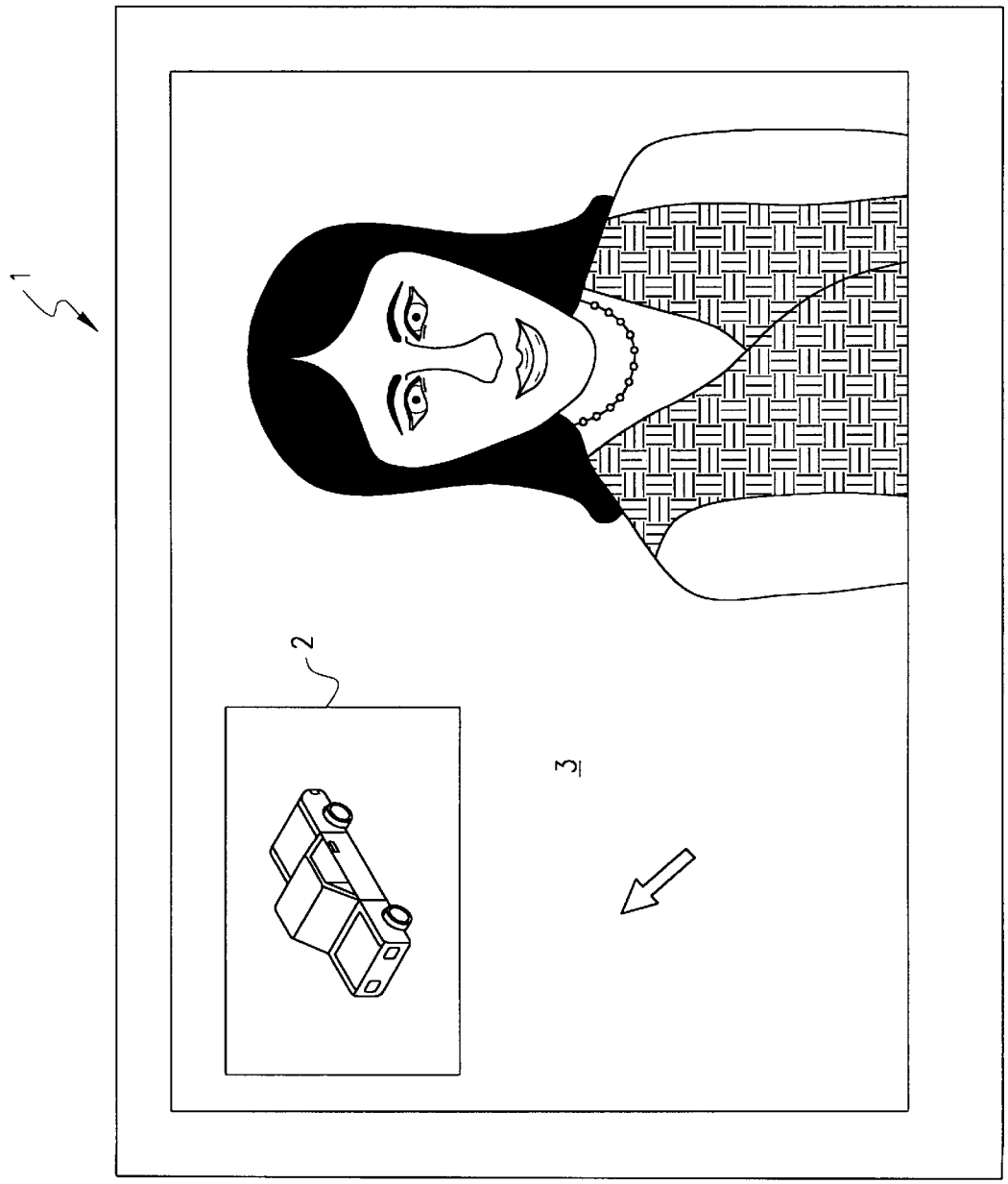
FIG. 1 is an illustrative drawing of an exemplary interactive display screen 1 during operation of the present invention.

FIG. 1 is an illustrative drawing of an exemplary interactive display screen 1 during operation of the present invention. From the subscriber's perspective, the present invention places a small window 2 in a portion of the video screen during a video telephone call. While the main part 3 of the screen displays an image of the other subscriber engaged in the telephone call, the small window displays a series of targeted advertisements. The invention, however, does more than just place a small image into a larger image. By utilizing an interactive display, the user is provided with the opportunity to select the small image in order to get more information about the displayed advertisements.

Figure 2:
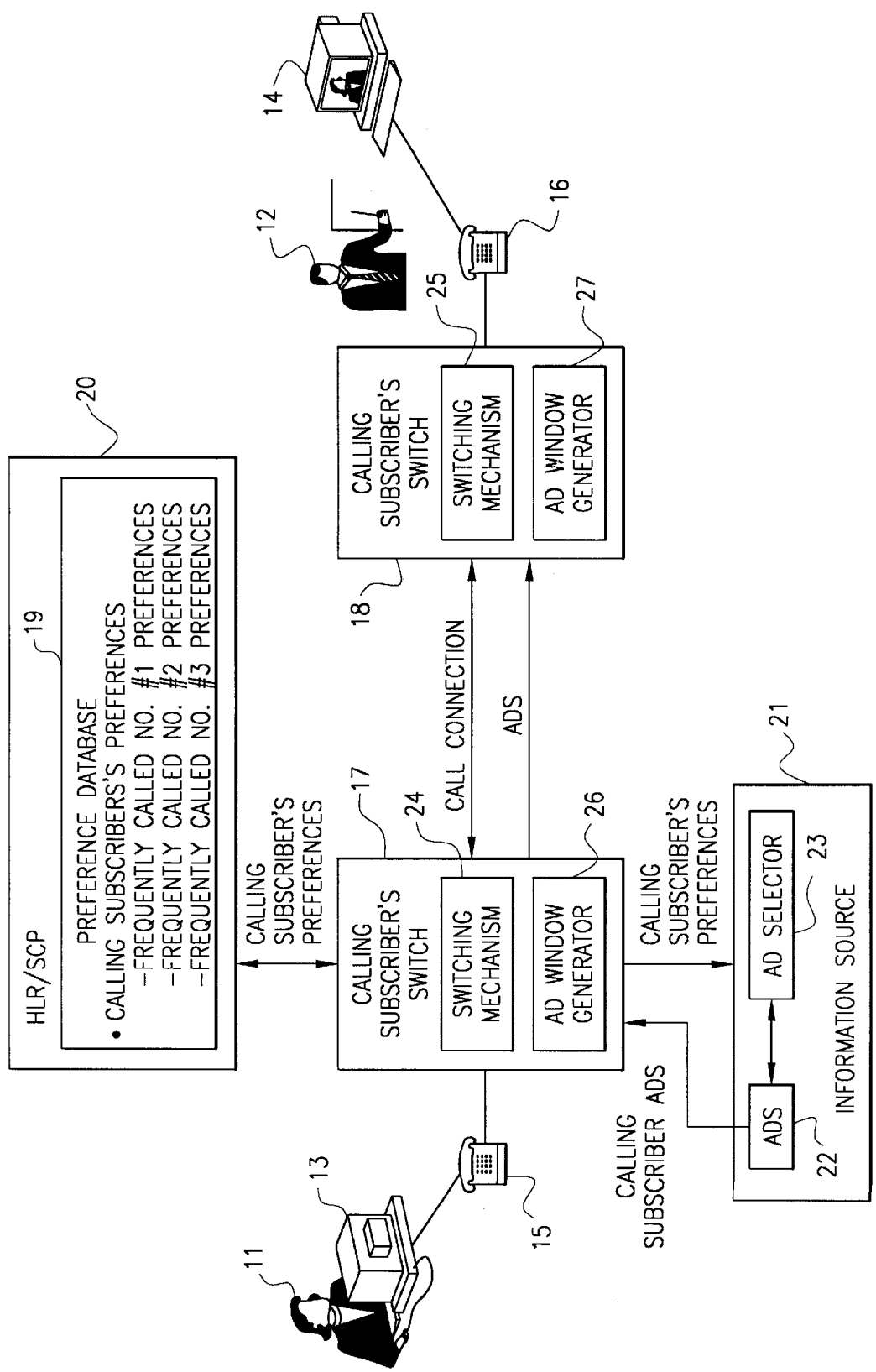
FIG. 2 is a simplified block diagram of a first embodiment of the system of the present invention.

FIG. 2 is a simplified block diagram of a first embodiment of the present invention. A calling subscriber 11 and a called subscriber 12 are engaged in a video telephone call utilizing interactive video displays 13 and 14, and video conferencing telephones 15 and 16, respectively. The calling subscriber's telephone 15 is connected to a calling subscriber's switch 17. The calling subscriber's switch, in turn, is connected to a switch 18 for the called subscriber. The system maintains a central database of subscriber preferences 19 for each video subscriber in the network. The present invention may be utilized with either landline telecommunications networks or radio telecommunications networks; therefore, the central database of subscriber preferences may be stored in a home location register (HLR), a service control point (SCP), in a combined HLR/SCP 20 as shown in FIG. 2, or any other suitable database. An information source 21 containing a library of advertisements 22 and an advertisement selector 23 is also connected to the calling subscriber's telephone switch.

When the calling subscriber initiates a video telephone call, a switching mechanism 24 within the calling subscriber's switch 17 handles the call by connecting to a switching mechanism 25 within the called subscriber's switch 18. The switching mechanism 24 also accesses the central database 19 and retrieves advertising preferences for the calling subscriber. The calling subscriber's database is populated with advertising preferences by recording which advertisements the calling subscriber has selected to view for more information in the past. The preferences may also be set based on data entered by the operator. For example, a customer profile based on demographics (age, sex, profession, income, leisure activities, etc.) may be utilized.

The preferences are then sent to the advertising selector 23 in the information source 21, and based on the calling subscriber's preferences, the selector then searches in the advertisement library 22 for advertisements for related goods and services. A few unrelated advertisements may also be selected in order to test their appeal on the calling subscriber. If the calling subscriber subsequently selects an unrelated advertisement, this new selection is utilized to update the subscriber's preferences in the calling subscriber's database. The selected advertisements are retrieved by the calling subscriber's switch 17 where an advertisement window generator 26 places the advertisements in the small window 2 on the calling subscriber's display 13. The calling subscriber's switch also sends the selected advertisements to the called subscriber's switch 18 where an advertisement window generator 27 places the advertisements in the small window on the called subscriber's display 14. Alternatively, each video telephone may include a window generator which generates the small window on the display and places the selected advertisements in the small window.

In the preferred embodiment, advertisements are displayed to both the calling subscriber and the called subscriber, and preferably, at any one time, the same advertisement is simultaneously shown to each subscriber. Then, if either subscriber finds a particular advertisement interesting, the advertisement can be selected and discussed. The selection may be made in any manner known in the art such as using a mouse and clicking on the small window, or by using the CTRL key on a keyboard along with a given letter (for example, CTRL-V for "view"), etc. Since selections may be made by either the calling subscriber or the called subscriber, the calling subscriber's preferences may also be influenced by those subscribers whom the calling subscriber calls. For example, during a typical video telephone call, either the calling subscriber or the called subscriber may find a displayed advertisement interesting, and may select it for further information. This selection, whether it is made by the calling subscriber or the called subscriber, may then be utilized to update the calling subscriber's preferences in the centralized database 19. In this manner, the advertisements that are shown to the calling subscriber reflect the interests not only of the calling subscriber, but also the interests of the calling subscriber's family and friends.

In order to update the calling subscriber's preferences following the selection of an advertisement by a called subscriber, the preferences of the subscribers are linked in the preference database 19. In the calling subscriber's profile, there is a list of frequently called subscriber numbers. For each of these numbers in the calling subscriber's profile, there is a history of the types of advertisements which have been selected by either party during calls between the calling subscriber and that particular called subscriber. If called subscriber #3, for example, selects an advertisement during a call with the calling subscriber, this fact is recorded in the calling subscriber's profile in an entry corresponding to frequently called number #3. Regardless of whether the calling subscriber or the frequently called subscriber #3 performs the "clicking" operation to select the advertisement, the entry in the calling subscriber's profile corresponding to called subscriber #3 is updated. In this manner, the calling subscriber's profile reflects the fact that this calling subscriber and this frequently called subscriber #3 are likely to talk together about the topic of this type of advertisement.

Thus, when the ad selector 23 selects advertisements based on the data retrieved from the calling subscriber's profile, the selected advertisements reflect the preferences of both the calling subscriber and the called subscriber. As an example, the calling subscriber may have four types of advertisements that he likes to choose. Additionally, frequently called number #1 (his wife, for example) may have very different tastes than frequently called number #2 (his brother, for example), and may choose different advertisements. When the calling subscriber calls his wife, if at least one of the four types of advertisements that he likes is shared with those of called number #1, then that type of advertisement is chosen first by the ad selector 23. When the calling subscriber calls his brother, if at least one of the four types of advertisements that he likes is shared with those of called number #2, then that type of advertisement is chosen first by the ad selector 23.

This method of building a database of preferences for the calling subscriber may be utilized to build a database of preferences for any consumer (referred to as the first consumer). The method then includes the steps of adding a preference to the first consumer's database whenever the first consumer purchases or requests information about a product, determining at least one additional consumer associated with the first consumer, and adding a preference to the first consumer's database whenever the additional consumer purchases or requests information about a product.

When advertisements are running in the small window 2, they may be still photographs, video, or other graphics, and may be displayed in time intervals of, for example, 5–15 seconds each. When an advertisement is selected by a subscriber, the selection is reported to the information source 21 which retrieves a longer, more detailed advertisement relating to the selected advertisement. The detailed advertisement, which may also include audio, is then presented to the subscribers. In addition, the displayed advertisement may enlarge to fill a larger portion or all of the screen. When this occurs, the image of the other subscriber may be placed within the small window. When the detailed advertisement is finished, the advertisement display returns to the small window, and the image of the other subscriber is enlarged to its original size. The selecting subscriber may also click on the image of the other subscriber during the running of the detailed advertisement to cancel it and return it to the small window.

Each subscriber's preference profile may also include information regarding which advertisements have been shown, how many times they have been shown, and how many times they were selected for more information. If an advertisement is shown a predetermined number of times, and is not selected for further information, it may be deleted from the preference profile. Additionally, the above information may be passed to the advertisement selector 23 which then ensures that each advertisement reflected in the profile is shown an appropriate number of times, and in an appropriate position in the sequence. This may be accomplished by randomly selecting advertisements and showing them in random order, or by showing priority advertisements more often and in a position in the sequence that is known to have a higher rate of being selected.

By entering a feature change request, the calling subscriber may turn the advertising system on or off. When placing a business call, for example, the calling subscriber may want to turn the advertising system off. When placing a personal call, however, the calling subscriber may want to turn the advertising system on. If desired, the network operator may apply reduced billing rates when the advertising system is turned on. This provides incentive for subscribers to utilize the advertising system, and with more subscribers using the system, more advertisers are likely to utilize the system, thus generating increased revenue for the network operator. A note may be placed in the charging record to indicate that an advertisement was selected. The note may simply be a marker to indicate that an advertisement was selected, or it may indicate which specific advertisement was selected, and how long the advertisement was viewed. In this way, many billing options become available to the system operator. A first reduced rate may be charged for simply having the advertising system turned on. A second reduced rate may be charged if an advertisement is selected and viewed for a significant period of time. Additionally, the system operator may conclude separate marketing agreements with advertisers who pay a portion of the toll if their advertisements are viewed for a significant period of time.

Figure 3:
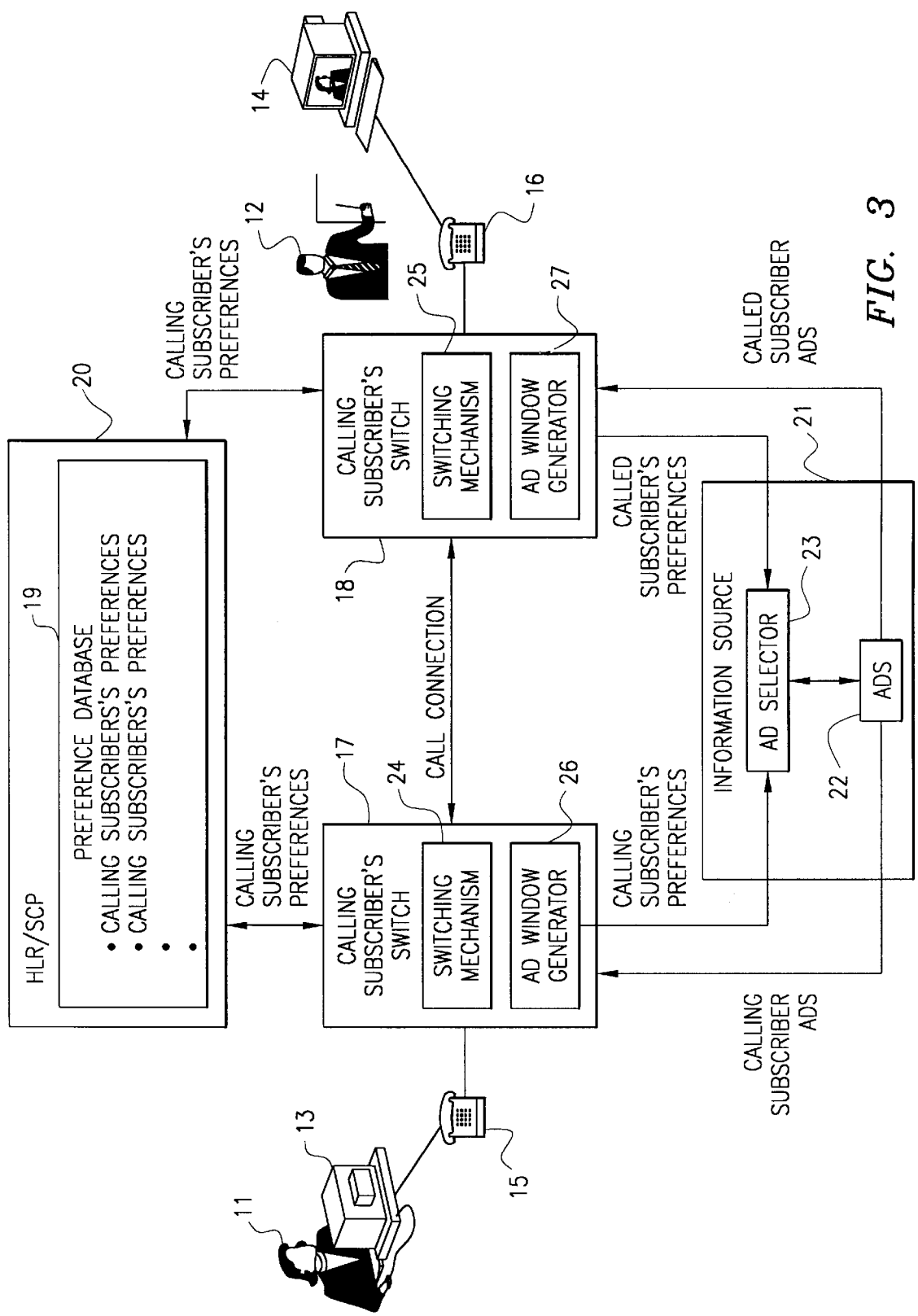
FIG. 3 is a simplified block diagram of a second embodiment of the system of the present invention.

FIG. 3 is a simplified block diagram of a second embodiment of the present invention. In this embodiment, the calling subscriber may be shown advertisements that reflect the calling subscriber's preferences while the called subscriber is shown advertisements that reflect the called subscriber's preferences. If one of the subscribers selects an advertisement for further information, the selected advertisement may be given precedence, and is then displayed to both subscribers so that it may be discussed.

In this embodiment, the advertising preferences for each subscriber are retrieved from the centralized preference database 19. Each subscriber's switch may access the database directly, or alternatively, the calling subscriber's switch 17 may retrieve the preferences for both subscribers and forward the called subscriber's preferences to the called subscriber's switch 18 during call setup. Each subscriber's preferences are then sent to the advertising selector 23 in the information source 21. The selector searches in the advertisement library 22 and selects advertisements for goods and services related to the calling subscriber's preferences. These advertisements are retrieved by the calling subscriber's switch 17. The selector also searches in the advertisement library and selects advertisements for goods and services related to the called subscriber's preferences. These advertisements are retrieved by the called subscriber's switch 18. In the calling subscriber's switch, an advertisement window generator 26 places the advertisements retrieved for the calling subscriber in the small window on the calling subscriber's display 13. In the called subscriber's switch, an advertisement window generator 27 places the advertisements retrieved for the called subscriber in the small window on the called subscriber's display 14.

If one of the subscribers selects an advertisement for further information, the system preempts the displayed advertisement on the other subscriber's display, and displays the selected advertisement to both subscribers so that it may be discussed.

Figure 4:
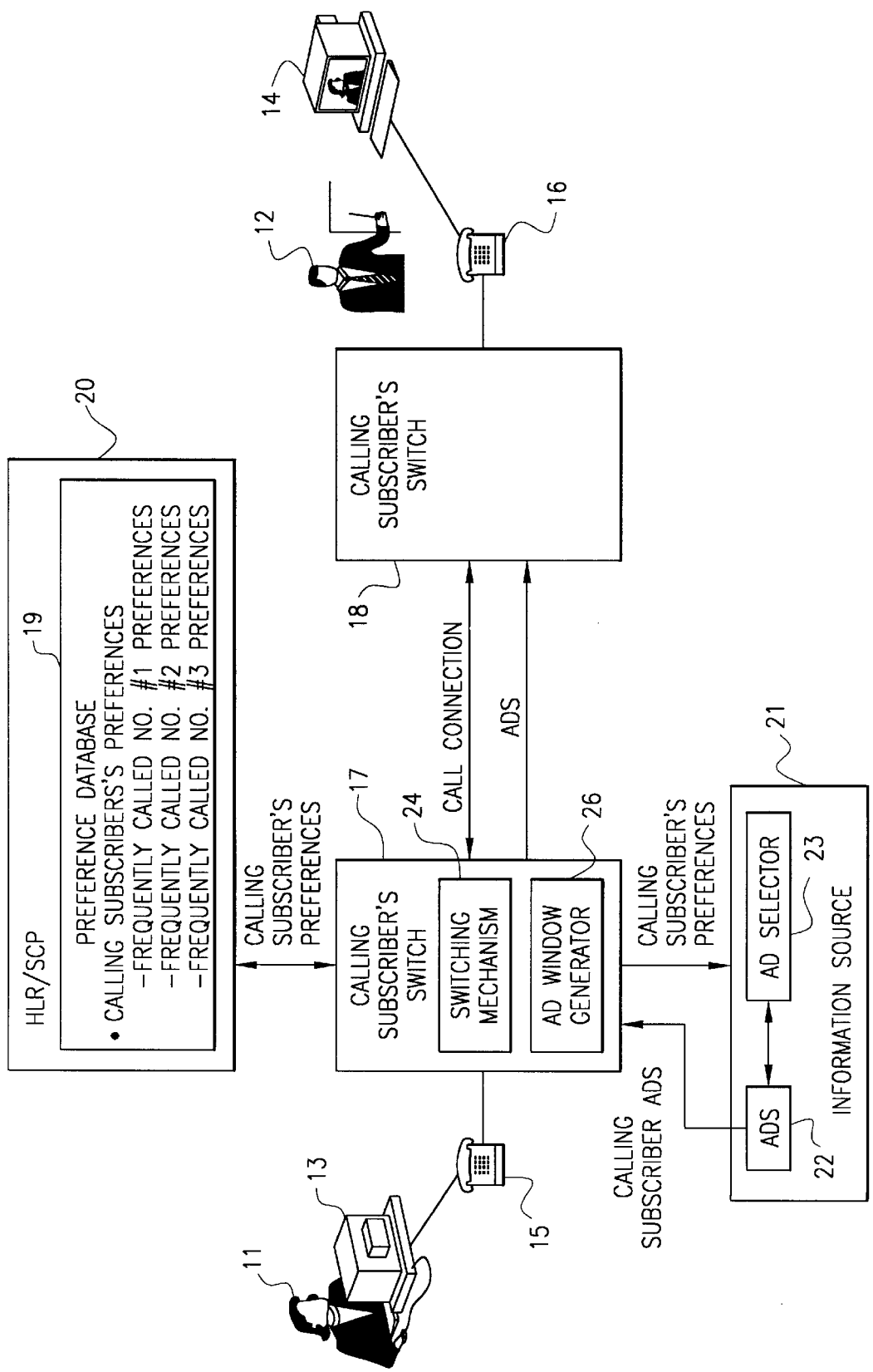
FIG. 4 is a simplified block diagram of a third embodiment of the present invention.

FIG. 4 is a simplified block diagram of a third embodiment of the present invention. In this embodiment, the called subscriber's switch 18 does not require its own ad window generator or ad switching mechanism. Instead, the calling subscriber's switch 17 inserts the advertisement window in both call paths, one toward the calling subscriber, and another toward the called subscriber.

The present invention may also be utilized during conference calls with more than two parties. In a "meet me" conference call, each subscriber calls into a predetermined number for a conference bridge. Thus, every subscriber is a calling subscriber since the called number is a conference device. In this case, each subscriber may view advertisements chosen according to each subscriber's own preference profile. Alternatively, the profile of one of the subscribers (such as the one being charged for the call) may be designated as the profile to use for a particular call. In this case, all of the subscribers involved in the call would view advertisements selected from the designated profile.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A system for providing advertising to subscribers conducting a video telephone call, said system comprising:

a calling subscriber's video telephone having a display screen;

an information source which stores a plurality of video advertisements;

a calling subscriber's switch connected to the calling subscriber's video telephone and the information source, said switch including:
means for retrieving the video advertisements from the information source; and
means for sending the retrieved advertisements to the calling subscriber's video telephone; and a database of individual subscriber advertising preferences connected to the calling subscriber's switch, said database including:
advertising preferences for the calling subscriber; and
a first set of advertising preferences for a first called subscriber that the calling subscriber is currently calling; and wherein the means for retrieving the advertisements from the information source includes means for retrieving advertisements from the information source based on the advertising preferences of the calling subscriber and the first called subscriber that the calling subscriber is currently calling.

2. The system for providing advertising to subscribers of claim 1 further comprising means within the calling subscriber's video telephone for generating a window on the display screen, said window displaying the retrieved advertisements.

3. The system for providing advertising to subscribers of claim 1 wherein the calling subscriber's switch includes means for generating a window on the display screen of the calling subscriber's video telephone, said window displaying the retrieved advertisements.

4. The system for providing advertising to subscribers of claim 3 further comprising:

a called subscriber's video telephone having a display screen with a window; and means within the calling subscriber's switch for sending the retrieved advertisements to the called subscriber's video telephone for display in the called subscriber's window.

5. The system for providing advertising to subscribers of claim 4 further comprising:

means for a subscriber to select one of the displayed advertisements; and means for providing additional information relating to the selected advertisement in response to the advertisement being selected.

6. The system for providing advertising to subscribers of claim 5 further comprising means for updating the advertising preferences of the subscriber who selected the selected advertisement in response to the advertisement being selected.

7. The system for providing advertising to subscribers of claim 1 wherein the database of subscriber advertising preferences also includes a second set of advertising preferences for a second called subscriber that the calling subscriber frequently calls, and the means for retrieving the advertisements from the information source includes means for retrieving advertisements from the information source based on the advertising preferences of the calling subscriber and the first called subscriber when the calling subscriber is calling the first called subscriber, and for retrieving advertisements from the information source based on the advertising preferences of the calling subscriber and the second called subscriber when the calling subscriber is calling the second called subscriber.

8. A system for providing targeted advertising to subscribers utilizing display screens to conduct a video telephone call, said system comprising:

a database of subscriber advertising preferences, said database including advertising preferences for a calling subscriber;

an information source including:
a plurality of advertisements; and
means for selecting advertisements from the plurality of advertisements based on the advertising preferences for the calling subscriber;

a calling subscriber's switch connected to the database and the information source, said switch including:
means for retrieving the advertising preferences for the calling subscriber from the database and sending the preferences to the information source;
means for retrieving the selected advertisements from the information source; and
means for generating a window on the calling subscriber's display screen, said window displaying the retrieved advertisements; and a called subscriber's switch connected to the calling subscriber's switch.

9. The system for providing targeted advertising of claim 8 wherein the calling subscriber's switch also includes means for sending the retrieved advertisements to the called subscriber's switch, and the called subscriber's switch includes means for generating a window on the called subscriber's display screen, said window displaying the retrieved advertisements.

10. The system for providing targeted advertising of claim 9 wherein the means for generating a window on the calling subscriber's display screen and the means for generating a window on the called subscriber's display screen include means for displaying a sequence of advertisements, each advertisement in the sequence being displayed for approximately 5–15 seconds.

11. The system for providing targeted advertising of claim 10 wherein the advertisements in the sequence of advertisements are randomly selected and displayed in random order.

12. The system for providing targeted advertising of claim 10 wherein the advertisements in the sequence of advertisements are selected and displayed in accordance with a predetermined priority.

13. The system for providing targeted advertising of claim 10 wherein the display screens are interactive display screens which enable the subscribers to select an advertisement and request more information about the selected advertisement.

14. The system for providing targeted advertising of claim 13 wherein the means for retrieving the selected advertisements from the information source includes means for retrieving expanded advertisements for advertisements that are selected by one of the subscribers for more information.

15. The system for providing targeted advertising of claim 14 wherein the database of subscriber advertising preferences includes means for adding an advertising preference to the database when an associated advertisement is selected by a subscriber for more information.

16. The system for providing targeted advertising of claim 15 wherein the database of subscriber advertising preferences includes:

means for determining how many times a particular advertisement is displayed, and how many times the particular advertisement is selected for more information; and means for removing the associated preference from the database when the particular advertisement is displayed a predetermined number of times without being selected for more information.

17. The system for providing targeted advertising of claim 16 wherein the database of subscriber advertising preferences also includes advertising preferences for a called subscriber, and the means for retrieving advertising preferences from the database also includes means for retrieving the advertising preferences for the called subscriber from the database and sending the called subscriber's preferences to the information source.

18. The system for providing targeted advertising of claim 17 wherein the means for selecting advertisements from the plurality of advertisements based on the advertising preferences for the calling subscriber also includes means for selecting advertisements from the plurality of advertisements based on the advertising preferences for the called subscriber.

19. The system for providing targeted advertising of claim 18 wherein the means for retrieving the selected advertisements from the information source includes means for retrieving advertisements based on the advertising preferences for the calling subscriber and advertisements based on the advertising preferences for the called subscriber.

20. The system for providing targeted advertising of claim 19 wherein the means for sending the retrieved advertisements to the called subscriber's switch includes means for sending advertisements based on the advertising preferences for the called subscriber to the called subscriber's switch.

21. A system in a telecommunications network for providing targeted advertising to a calling subscriber and a called subscriber utilizing display screens to conduct a video telephone call, said system comprising:

a centralized database of subscriber advertising preferences, said database including advertising preferences for subscribers within the network;

an information source including:
a plurality of advertisements; and
means for selecting advertisements from the plurality of advertisements based on the advertising preferences for the calling subscriber and the called subscriber;

a calling subscriber's switch connected to the database and the information source, said calling subscriber's switch including:

means for retrieving the advertising preferences for the calling subscriber from the database and sending the preferences to the information source;

means for retrieving advertisements selected from the calling subscriber's preferences from the information source; and means for generating a window on the calling subscriber's display screen, said window displaying the retrieved advertisements selected from the advertising preferences for the calling subscriber; and a called subscriber's switch connected to the database and the information source, said called subscriber's switch including:

means for retrieving the advertising preferences for the called subscriber from the database and sending the preferences to the information source;

means for retrieving advertisements selected from the called subscriber's preferences from the information source; and means for generating a window on the called subscriber's display screen, said window displaying the retrieved advertisements selected from the advertising preferences for the called subscriber.

22. The system for providing targeted advertising of claim 21 wherein the display screens are interactive display screens which enable the calling subscriber and the called subscriber to select a displayed advertisement and request more information about the selected advertisement.

23. The system for providing targeted advertising of claim 22 wherein the calling subscriber's switch includes means for sending a displayed advertisement which has been selected by the calling subscriber for more information to the called subscriber's switch for display to the called subscriber.

24. The system for providing targeted advertising of claim 23 wherein the called subscriber's switch includes means for sending a displayed advertisement which has been selected by the called subscriber for more information to the calling subscriber's switch for display to the calling subscriber.

25. A method of building a database of preferences for a first consumer comprising the steps of:

adding a preference to the first consumer's database whenever the first consumer purchases or requests information about a product;

determining a plurality of additional consumers with whom the first consumer interacts;

building a database of preferences for each of the plurality of additional consumers based on purchases or requests for information made by each specific additional consumer; and selectively combining preferences from the first consumer's database and preferences from the database of a specific additional consumer with whom the first consumer is currently interacting.

26. The method of building a database of preferences of claim 25 wherein the first consumer is a calling subscriber in a telecommunications network, and the additional consumers are additional subscribers in the telecommunications network, and the step of determining a plurality of additional consumers with whom the first consumer interacts includes identifying a plurality of additional subscribers who are frequently called by the calling subscriber.

27. The method of building a database of preferences of claim 25 wherein the first consumer is a calling subscriber engaged in a video telephone call in a telecommunications network, and the additional consumers are additional subscribers in the telecommunications network, and the step of adding a preference to the first consumer's database whenever the first consumer purchases or requests information about a product includes adding a preference to the calling subscriber's preference database whenever the calling subscriber selects a video advertisement for further information during a video telephone call.

28. The method of building a database of preferences of claim 27 wherein the first consumer is a calling subscriber engaged in a video telephone call in a telecommunications network, and the additional consumers are additional subscribers in the telecommunications network, and the step of building a database of preferences for each of the plurality of additional consumers based on purchases or requests for information made by each specific additional consumer includes adding a preference to the preference database of a specific additional subscriber whenever the specific additional subscriber selects a video advertisement for further information during a video telephone call with the calling subscriber.

* * * * *